United States Patent
Vachnish et al.

(10) Patent No.: US 12,273,717 B2
(45) Date of Patent: Apr. 8, 2025

(54) SECURE SNIFFING OF WIRELESS CONNECTIONS WITH FORWARD SECRECY

(71) Applicant: TEXAS INSTRUMENTS INCORPORATED, Dallas, TX (US)

(72) Inventors: Yedidya Yechiel Vachnish, Revava (IL); Barak Cherches, Ramat Ha'Kovesh (IL); Avi Sammy Berkovich, Herzeliya (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 210 days.

(21) Appl. No.: 17/898,357

(22) Filed: Aug. 29, 2022

(65) Prior Publication Data

US 2024/0073693 A1  Feb. 29, 2024

(51) Int. Cl.
H04L 29/06 (2006.01)
H04L 9/08 (2006.01)
H04L 9/30 (2006.01)
H04L 9/32 (2006.01)
H04W 12/033 (2021.01)
H04W 12/121 (2021.01)

(52) U.S. Cl.
CPC ......... *H04W 12/121* (2021.01); *H04L 9/0819* (2013.01); *H04L 9/30* (2013.01); *H04L 9/3247* (2013.01); *H04L 9/3268* (2013.01); *H04W 12/033* (2021.01)

(58) Field of Classification Search
CPC ....................................................... H04L 63/10
See application file for complete search history.

(56) References Cited

U.S. PATENT DOCUMENTS

| | | | |
|---|---|---|---|
| 2018/0062854 A1* | 3/2018 | Kancharla | H04L 63/101 |
| 2018/0278419 A1* | 9/2018 | Higgins | H04L 63/0428 |
| 2019/0068564 A1* | 2/2019 | Putatunda | H04L 63/08 |
| 2024/0381053 A1* | 11/2024 | Liu | G01S 13/765 |

OTHER PUBLICATIONS

Harkins, Dan., "Dragonfly Key Exchange," Aruba Networks, Nov. 2015, 18 p. [Online] https://www.rfc-editor.org/rfc/rfc7664.html.

(Continued)

*Primary Examiner* — Jason K Gee
(74) *Attorney, Agent, or Firm* — Mandy Barsilai Fernandez; Frank D. Cimino (57) ABSTRACT

In at least one example, a method includes establishing, by a sniffer provisioning server (SPS) of a first wireless device, a trusted relationship between the first wireless device and a sniffer tool using a public key of the sniffer tool. An out-of-band (OOB) key exchange provisions the public key of the sniffer tool to the wireless device. The method further includes obtaining, by the SPS, key material uniquely related to a communication session established between the first wireless device and a second wireless device using a shared password. The key material excludes the shared password and a session key uniquely related to the communication session. The method further includes publishing, by the SPS, the key material over a channel to the sniffer tool based on the trusted relationship. The channel is secured using the public key of the sniffer tool.

20 Claims, 7 Drawing Sheets

(56) References Cited

OTHER PUBLICATIONS

IEEE Computer Society, "IEEE Standard for Information Technology," Jul. 23, 2004, 190 p.
IEEE Computer Society, "Port-Based Network Access Control," IEEE Standard for Local and Metropolitan Area Networks, Jan. 30, 2020, 289 p.
Wi-Fi Alliance, "WPA3™ Specification Version 3.0," ©2020 Wi-Fi Alliance, 30 p.

* cited by examiner

SECURE SNIFFING OF WIRELESS CONNECTIONS WITH FORWARD SECRECY

BACKGROUND

Sniffer tools or packet sniffers, which are also referred to as network analyzers or protocol analyzers, are tools for network traffic monitoring. Network traffic monitoring can involve a sniffer tool capturing data propagating through a network in the form of messages or packets. Captured packets may be stored in memory (e.g., non-transitory storage medium) for subsequent analysis. Each captured packet generally includes a header and a payload. The header of a captured packet can include control information for the captured packet, such as a destination address and a source address. The payload of a captured packet can include data being communicated using the captured packet such as application data. Information obtained from analyzing captured packets can be useful for debugging protocol implementations, monitoring network health, troubleshooting, managing network security, and/or other purposes.

SUMMARY

In at least one example, a method includes establishing, by a sniffer provisioning server (SPS) of a first wireless device, a trusted relationship between the first wireless device and a sniffer tool using a public key of the sniffer tool. An out-of-band (OOB) key exchange provisions the public key of the sniffer tool to the wireless device. The method further includes obtaining, by the SPS, key material uniquely related to a communication session established between the first wireless device and a second wireless device using a shared password. The key material excludes the shared password and a session key uniquely related to the communication session. The method further includes publishing, by the SPS, the key material over a channel to the sniffer tool based on the trusted relationship. The channel is secured using the public key of the sniffer tool.

In at least one example, a non-transitory computer-readable medium includes instructions that are executable by a processor of a sniffer tool to cause the sniffer tool to perform operations. The operations include establish, by a sniffer provisioning client (SPC) of the sniffer tool, a trusted relationship between the sniffer tool and a first wireless device responsive to an OOB key exchange. The OOB key exchange provisions a public key of the first wireless device to the SPC. The operations further include receive, by the SPC, key material from a SPS of the first wireless device based on the trusted relationship. The key material is uniquely related to a communication session established between the first wireless device and a second wireless device using a shared password. The key material excludes the shared password and a session key that is uniquely related to the communication session. The operations further include build, by the SPC, the session key using key material and the public key of the first wireless device.

In at least one example, a device includes a processor and memory operatively coupled to the processor. The memory storing non-transitory instructions that are executable by the processor to cause the processor to perform operations. The operations include read, by a SPS of the device from the memory, a public key of a sniffer tool, wherein an OOB key exchange provisions the public key of the sniffer tool to the memory. The operations further include validate, by the SPS, the public key of the sniffer tool using a root-of-trust. The operations further include establish, by the SPS, a trusted relationship between the sniffer tool and the device responsive to validating the public key of the sniffer tool. The operations further include publish, by the SPS, key material to a SPC of the sniffer tool based on the trusted relationship. The key material is uniquely related to a communication session established between the device and a station (STA) using a shared password. The key material excludes the shared password and a session key uniquely related to the communication session.

DETAILED DESCRIPTION

As described above, information obtained from analyzing packets captured by a sniffer tool can be useful for various purposes. The header of a captured packet is generally unencrypted. Accordingly, contents of the header are visible to the sniffer tool. The payload of a captured packet can be encrypted in accordance with a security protocol used to secure a network connection propagating the captured packet. Analyzing the payload of a captured packet involves decrypting the payload. Responsive to decrypting the payload, the contents of the payload become visible to the sniffer tool. Techniques for decrypting the payload of a captured packet can vary based on the particular security protocol used to secure a network connection propagating the captured packet.

For example, some security protocols involve securing network connections with session keys built using a pre-shared key (PSK) authentication process. In accordance with the PSK authentication process, devices receive a PSK before establishing network connections to facilitate authentication. Following successful authentication, any entity with the PSK that captures authentication-related communications, such as Extensible Authentication Protocol Over LAN (EAPOL) packets, may be configured to determine a session key built using the PSK authentication process. Such entities may be further configured to use the session key to decrypt any data encrypted with session key. Accordingly, security protocols that secure network connections with session keys built via a PSK authentication process are generally unable to secure network traffic with forward secrecy. Wireless Fidelity (WI-FI) Protected Access II (WPA2), which is incorporated herein by reference, is a security protocol developed by the WI-FI ALLIANCE to secure wireless networks. WPA2 can secure a network connection with a session key built using a PSK authentication process. A sniffer tool may be configured to receive a PSK and to capture handshake messages exchanged during an PSK authentication process that builds a session key. The sniffer tool may be further configured to build the session key using the PSK and the captured handshake messages for decrypting captured packets that are encrypted with the session key.

Another example, Simultaneous Authentication of Equals (SAE) is a security protocol that uses a password-based authentication process to build session keys for securing network connections. The password-based authentication process of SAE involves using a shared password in a zero-knowledge proof key exchange between a pair of devices. Each device generates a key (e.g., a pairwise master key (PMK) through the password-based authentication process of SAE without exposing the shared password. Each device uses the key to build a session key for a corresponding communication session between the pair of devices. The key generated by each device through the password-based authentication process can include a number of cryptographic parameters or key material with limited availability external to the pair of devices. Absent the key material, the shared password alone is insufficient to build the session key for the corresponding communication session. Such security protocols are generally able to secure network traffic with forward secrecy. WI-FI Protected Access 3 (WPA3) specification, which is incorporated herein by reference, is a security protocol developed by the WI-FI ALLIANCE to secure network connections. WPA3 specification includes a mode (WPA3-Personal) that can secure a network connection with a session key built using a password-based authentication process. A sniffer tool, provisioned a shared password or otherwise, is generally precluded from decrypting the payload of a captured packet that is encrypted with a session key built using the password-based authentication process.

Aspects of this description relate to a sniffer provisioning framework that can facilitate secure sniffing of wireless connections with forward secrecy. In at least one example, the sniffer provisioning framework can include a sniffer provisioning server (SPS) that is configured to establish, from a wireless device, a trusted relationship between the wireless device and a sniffer tool. In at least one example, the sniffer provisioning framework can include a trusted agent or sniffer provisioning client (SPC) that may be configured to establish, from a sniffer tool, a trusted relationship between a wireless device and the sniffer tool. The sniffer provisioning framework may be configured to create a trusted information exchange between a wireless device and a sniffer tool. The sniffer provisioning framework may be further configured to provide, responsive to creating the trusted relationship, key material to the sniffer tool in a manner that reduces exposure of the key material to untrusted entities.

Figure 1:
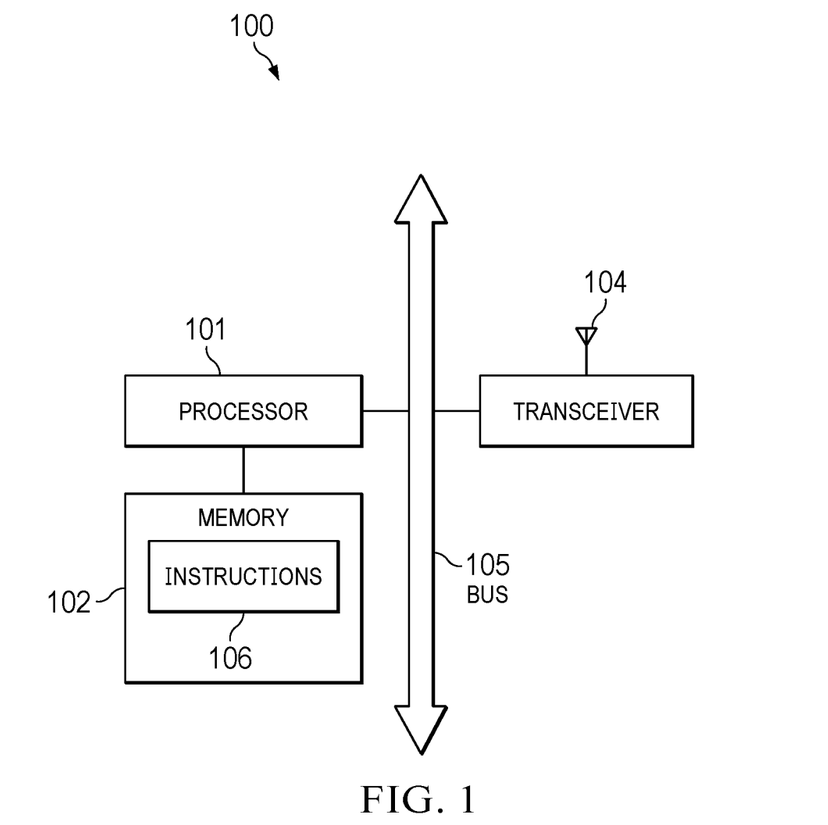
FIG. 1 is a block diagram of a processing and communication system, in accordance with various examples.

FIG. 1 is a block diagram of a processing and communication system 100 that may be configured to process and exchange data, in accordance with various examples. The processing and communication system 100 may be a wireless device that may be configured to establish a connection to transmit and receive messages or packets in accordance with a WLAN communication protocol. In some examples, the processing and communication system 100 may also be a desktop computer, a laptop, a tablet, a smartphone, or other devices that may be configured to establish a connection to transmit and to receive messages or packets in accordance with a WLAN communication protocol. The processing and communication system 100 may also be a sniffer tool that may be configured to capture data propagating over a connection established in accordance with the WLAN communication protocol in the form of messages or packets. In some examples, the processing and communication system 100 may be a system on a chip (SoC), an electronic circuit board or a computer card.

The processing and communication system 100 includes hardware components for establishing a connection and transmitting and receiving data in accordance with the WLAN communication protocol. As shown in FIG. 1, the processing and communication system 100 may include one or more processors 101 and one or more memories 102. The processing and communication system 100 may also include one or more transceivers 103 and one or more antennas 104 for establishing wireless connections. These components may be coupled through a bus 105, or in any other suitable manner. In FIG. 1, an example in which the components are coupled through a bus 105 is shown.

The processor 101 may be configured to read and execute computer-readable instructions. For example, the processor 101 may be configured to invoke and execute instructions in a program stored in the memory 102, including instructions 106. Responsive to the processor 101 transmitting data, the processor 101 drives or controls the transceiver 103 to perform the transmitting. The processor 101 also drives or controls the transceiver 103 to perform receiving, responsive to the processor 101 receiving data. Therefore, the processor 101 may be considered as a control center for performing transmitting or receiving data and the transceiver 103 is an executor for performing the transmitting and receiving operations.

In some examples, the memory 102 is coupled to the processor 101 through the bus 105. In other examples, the memory 102 is integrated with the processor 101. The memory 102 is configured to store various software programs and/or multiple groups of instructions, including the instructions 106. The memory 102 may include one or more storage devices. For example, the memory 102 includes a high-speed random-access memory and/or may include a nonvolatile memory such as one or more disk storage devices, a flash memory, another nonvolatile solid-state storage device, or a pseudostatic random-access memory (PSRAM). The memory 102 may store an OS such as ANDROID, IOS, WINDOWS or LINUX. The memory 102 may further store a network communications program. The processing and communication system 100 uses the network communications program stored in the memory 102 to perform communications with one or more attached devices, one or more user equipment, or one or more network devices. The memory 102 may further store a user interface program. The user interface program displays content of an application through a graphical interface and receive data or an operation performed by a user on the application via an input control such as a menu, a dialog box or a physical input device (not shown). The memory 102 may be configured to store the instructions 106 for implementing the various methods and processes provided in accordance with the various examples of this description.

The transceiver 103 includes a transmitter and a receiver. The transceiver 103 may be configured to transmit one or more signals that the processor 101 provides. The transceiver 103 may also be configured to receive one or more signals from other devices or equipment. In this example, the transceiver 103 may be considered a wireless transceiver. The antenna 104 may be configured to enable the exchanging of wireless communication signals between the transceiver 103 and a network or another system or device.

The processing and communication system 100 may also include another communication component such as a WI-FI module, a Global Positioning System (GPS) module, cellular module, a BLUETOOTH or BLUETOOTH low energy (BLE) module, Zigbee module, Long Term Evolution (LTE), LTE-Machine Type Communication (LTE-M), Narrow Band LTE (NB-LTE), or a Sub-Gigahertz Communication (sub1G). The processing and communication system 100 may also support another wireless communication signal such as a satellite signal or a short-wave signal. The processing and communication system 100 may also be provided with a wired network interface or a local area network (LAN) interface to support wired communication.

In various examples, the processing and communication system 100 may further include an input/output interface (not shown) for enabling communications between the processing and communication system 100 and one or more input/output devices (not shown). Examples of the input/output devices include an audio input/output device, a key input device, a display and the like. The input/output devices are configured to implement interaction between the processing and communication system 100 and a user or an external environment. The input/output device may further include a camera, a touchscreen, a sensor, and the like. The input/output device communicates with the processor 101 through a user interface.

The processing and communication system 100 shown in FIG. 1 is an example of a processing and communication system or device. During actual application, the processing and communication system 100 may include more or fewer components. The processing and communication system 100 may be part of a wireless device that is connected to other wireless devices or STAs. The processing and communication system 100 may also be part of a sniffer tool that may be configured to monitor data that transfers over connections between wireless devices or STAs in the form of messages or packets.

Figure 2:
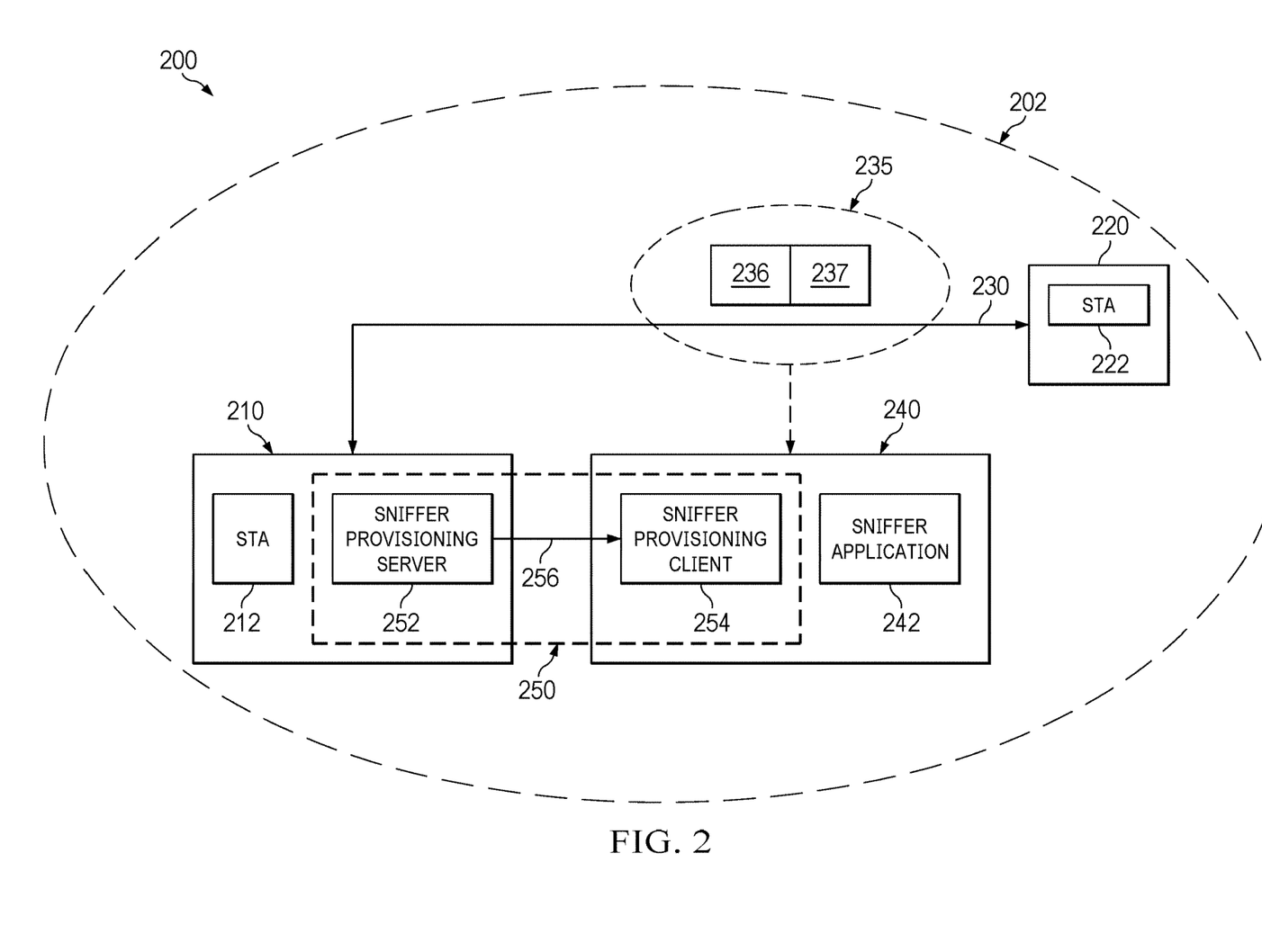
FIG. 2 is a diagram of an operating environment for transferring data over a transmission medium, in accordance with various examples.

FIG. 2 is a diagram of an operating environment 200 for transferring data, in accordance with various examples. A STA generally includes computing resources (e.g., the processor 101 and the memory 102) and a network interface controller. In a WLAN (e.g., WLAN 202), a network interface controller of a STA may be configured to couple the computing resources of the STA to a transceiver (e.g., the transceiver 103). A STA may be configured to establish and/or terminate a network connection between the STA and another STA using a network transmission medium such as radio frequency (RF) waves in a WLAN. Connections between STAs can be established and/or terminated in accordance with a communication protocol of a network such as a WLAN communication protocol in a WLAN. A connection between a STA and another STA can form links (e.g., wireless links) between the STAs. In at least one example, the links formed between the STAs can include a link formed between a STA and an access point (AP). In at least one example, a STA can refer to a STA as described in the Institute of Electrical and Electronics Engineers (IEEE) 802.11 specification. Each STA may be configured to transfer data in the form of packets or messages over the links during a communication session. A communication session between STAs can occur within a duration that extends from about a time that a connection is established between the STAs and about a time that the connection is terminated between the STAs.

The operating environment 200 can include a WLAN 202 that operates in accordance with a WLAN communication protocol. For example, WI-FI is a WLAN communication protocol developed by the WI-FI ALLIANCE that is generally based on the IEEE 802.11 specification, which is incorporated herein by reference. The operating environment 200 also includes a first wireless device 210 with a first STA 212 and a second wireless device 220 with a second STA 222. In at least one example, the first wireless device 210 can further include a distribution system access function (DSAF), and accordingly the first wireless device 210 can be an AP of the WLAN 202. In at least one example, the second wireless device 220 can further include a DSAF, and accordingly the second wireless device 220 can be an AP of the WLAN 202. The first STA 212 and the second STA 222 can each be configured to establish connections in accordance with the WLAN communication protocol of the WLAN 202. Wireless links (e.g., wireless link 230) between the first STA 212 and the second STA 222 are formed by establishing such connections. The first wireless device 210 and the second wireless device 220 can each be configured to transfer data over wireless links (e.g., wireless link 230) between the first STA 212 and the second STA 222 in the form of packets (e.g., packet 235) during a communication session. In accordance with the WLAN communication protocol of the WLAN 202, a packet (e.g., packet 235) can include a header and a payload. The header (e.g., header 236) of a packet can include control information for the packet, such as a destination address and a source address. The payload (e.g., 237) of a packet can include data being transferred using the packet such as application data.

In accordance with a security protocol of the WLAN 202, establishing a communication session between the first STA 212 and the second STA 222 can involve a password-based authentication process. The password-based authentication process can involve a password authenticated key exchange (PAKE) between the first STA 212 and the second STA 222 to build a session key that is uniquely related to the communication session. In at least one example, the password-based authentication process can include mutual authentication and mutual key derivation between the first STA 212 and the second STA 222. The first STA 212 and the second STA 222 may each be configured to use the session key built with the password-based authentication process to encrypt packets (e.g., packet 235) transferred during the communication session with forward secrecy. For example, packets encrypted using a session key built through the password-based authentication process known as SAE are encrypted with forward secrecy. The SAE authentication process is based on the Dragonfly Key Exchange described in the Internet Research Task Force (IRTF) Request for Comments (RFC) publication 7664, which is incorporated herein by reference. In at least one example, the SAE authentication process can involve a Diffie-Hellman Elliptic-Curve Key Exchange between the first STA 212 and the second STA 222.

In accordance with the SAE authentication process, the first STA 212 and the second STA 222 can each generate a password element based on a shared password using a hunting-and-pecking technique or other hash-to-curve transform. Each STA may be configured to use the respective password elements as base elements in a Diffie-Hellman key exchange between the first STA 212 and the second STA 222. Each STA can generate a pairwise master key (PMK) following the Diffie-Hellman key exchange that is uniquely related to a corresponding communication session.

Figure 3:
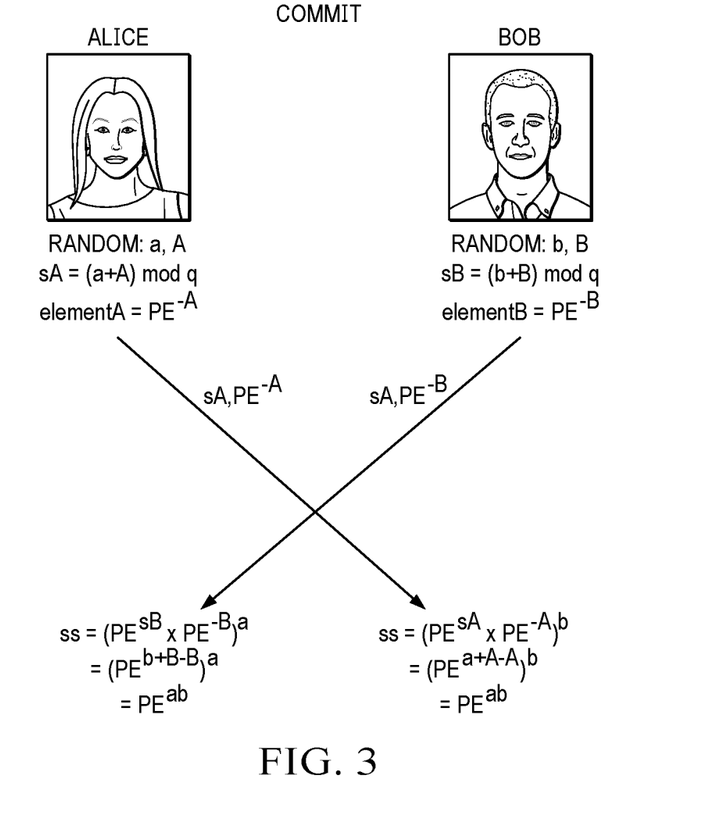
FIG. 3 is a diagram of an exchange between peer devices, in accordance with various examples.

FIG. 3 is a diagram of an exchange between peer devices (e.g., the first STA 212 and the second STA 222) using the SAE authentication process, in accordance with various examples. The WPA3 specification describes the exchange between peer devices using the SAE authentication process. The exchange shown in FIG. 3 may be useful to generate a PMK that is uniquely related to a corresponding communication session. In at least one example, the exchange shown in FIG. 3 can correspond to a commit exchange of the SAE authentication process. The peer devices are designated in FIG. 3 as Alice and Bob by convention. As shown by FIG. 3, Alice and Bob each calculate, according to a PSK, two random numbers: private and mask. Each random number is an integer that has a value greater than one and less than an order (q) from a selected domain parameter set, where q is a prime number. The two random numbers that Alice generates in FIG. 3 are private1 (e.g., a); and mask1 (e.g., A). The two random numbers that Bob generates in FIG. 3 are private2 (e.g., b); and mask2 (e.g., B). Alice and Bob also each convert a shared password (e.g., P) into a password element (PE) using elliptical curve cryptography (ECC) or finite field cryptography (FFC). Each peer can use the two random values and the password element to construct a scalar and an element. Alice can send a scalar (e.g., sA) and an element (e.g., elementA) constructed by Alice to Bob in an exchange. Bob can send a scalar (e.g., sB) and an element (e.g., elementB) constructed by Bob to Alice in the exchange. Alice can generate a shared secret (e.g., ss) using the element (e.g., elementB) and the scalar (e.g., sB) received from Bob during the exchange. Bob can also generate the shared secret (e.g., ss) using the element (e.g., elementA) and the scalar (e.g., sA) received from Alice during the exchange. Each peer uses a hash-function and the shared secret (e.g., ss) to generate the PMK that is uniquely related to the corresponding communication session. In at least one example, the PMK can be calculated according to: PMK=H(k|sA+sB mod r), where H is the hash-function, k is a point to which a bijective function maps the shared secret (e.g., ss), and r equals the order (q) from the selected domain parameter set.

With reference to FIG. 2, each STA can pipe the PMK into an Extensible Authentication Protocol (EAP) four-way handshake between the first STA 212 and the second STA 222 to generate a session key uniquely related to the corresponding communication session. The IEEE 802.1X specification, incorporated herein by reference, describes the EAP four-way handshake. The first STA 212 and the second STA 222 may each be configured to use the session key to encrypt packets (e.g., packet 235) transferred over wireless links (e.g., wireless link 230) during that communication session with forward secrecy. In at least one example, the session key can include a pairwise transient key (PTK), a group transient key (GTK), or both.

The operating environment 200 also includes a sniffer tool 240 with a sniffer application 242. The sniffer tool 240 may be configured to monitor network traffic within the WLAN 202. In at least one example, the sniffer tool 240 may be configured to monitor network traffic exchanged on a link between a STA and an AP. The sniffer application 242 may be configured to analyze packets captured or intercepted by the sniffer tool 240. One aspect of network traffic monitoring can involve the sniffer tool 240 capturing the packet 235 transferred over the wireless link 230 between the first STA 212 and the second STA 222. In accordance with the security protocol of the WLAN 202, a header 236 of the packet 235 may be unencrypted. Accordingly, the header 236 may be visible to the sniffer tool 240 and available for analysis by the sniffer application 242. In accordance with the security protocol of the WLAN 202, a payload 237 of the packet 235 may be encrypted with forward secrecy using a session key built with a password-based authentication process (e.g., the SAE authentication process). Accordingly, the payload 237 may be indiscernible to the sniffer tool 240 and unavailable for analysis by the sniffer application 242. Decrypting the packet 235 may be useful to render the payload 237 visible to the sniffer tool 240 and accordingly available to the sniffer application 242 for analysis. A session key used to encrypt the packet 235 with forward secrecy may be unavailable to the sniffer tool 240. The sniffer tool 240 may thereby be precluded from decrypting the payload 237 without the session key used to encrypt the packet 235 with forward secrecy.

The operating environment 200 also includes a sniffer provisioning framework 250. The sniffer provisioning framework 250 may be configured to create a trusted information exchange between the first wireless device 210 and the sniffer tool 240. The first wireless device 210 may be configured to provide, responsive to the sniffer provisioning framework 250 creating the trusted information exchange, key material to the sniffer tool 240 in a manner that reduces exposure of the key material to untrusted entities. Key material can include random values (e.g., private1, mask1, private2, and/or mask2) generated by peer devices in a particular implementation of the SAE authentication process. Key material generally excludes a session key used to encrypt a packet with forward secrecy and a shared password used to build the session key. The sniffer tool 240 may be configured to use key material provided through the sniffer provisioning framework 250 to decrypt packets with forward secrecy at the sniffer tool 240. The sniffer provisioning framework 250 includes an SPS 252 and a trusted agent or SPC 254. The SPS 252 and the SPC 254 may each be configured to create a trusted relationship between the first wireless device 210 and the sniffer tool 240, respectively. In at least one example, the SPS 252 may be configured to operate in multiple states that include a disabled state and an enabled state. Functionalities provided by the SPS 252 are deactivated while the SPS 252 operates in the disabled state. Functionalities provided by the SPS 252 are activated while the SPS 252 operates in the enabled state. The disabled state may be configured as a default state of the SPS 252.

As described in greater detail below, data provisioned via out-of-band (OOB) channels may be used to establish a trusted relationship between the first wireless device 210 and the sniffer tool 240. A trusted information exchange can involve the SPS 252 publishing, responsive to the trusted relationship, key material over a channel 256 to the SPC 254. The key material may be uniquely related to a communication session established between the STA 212 and the STA 222 using a shared password. The SPC 254 may be configured to build a session key uniquely related to the communication session using the key material. Data provisioned via OOB channels to establish the trusted relationship may also be used to secure the channel 256. In at least one example, the channel 256 is an OOB channel. In at least one example, the channel 256 is an in-band (IB) channel. An OOB channel can generally refer to a communication channel that excludes the WLAN 202 as a transmission medium. An IB channel can generally refer to a communication channel that includes the WLAN 202 as a transmission medium. For example, an OOB channel can include a wired communication channel (e.g., universal serial bus (USB), universal asynchronous receiver/transmitter (UART), inter-integrated circuit (I2C)), a wireless communication channel that operates at a frequency that is external to a frequency band of the WLAN 202 (e.g., BLUETOOTH, BLE, near field communication (NFC), satellite, infrared), or other communication channels that exclude the WLAN 202 as a transmission medium.

Figure 4:
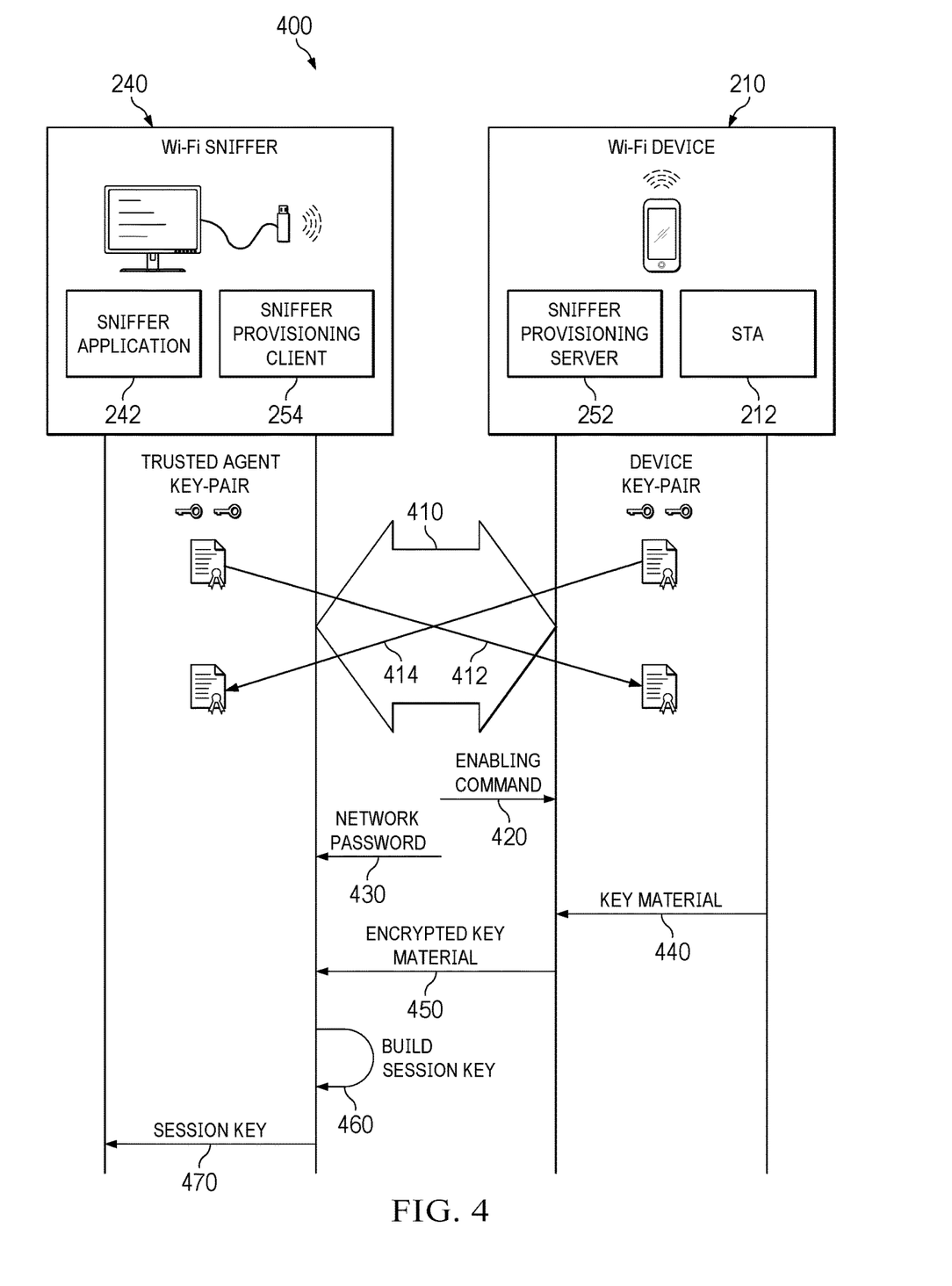
FIG. 4 is a signaling diagram of a trusted information exchange, in accordance with various examples.

FIG. 4 is a signaling diagram 400 that illustrates an implementation of a trusted information exchange, in accordance with various examples. The signaling diagram 400 can include an OOB key exchange 410 between the SPC 254 of the sniffer tool 240 and the SPS 252 of the first wireless device 210. The SPC 254 of the sniffer tool 240 and the SPS 252 of the first wireless device 210 may each be configured to establish a trusted relationship between the first wireless device 210 and the sniffer tool 240 via the OOB key exchange 410. The OOB key exchange 410 can include the SPS 252 receiving, via an OOB channel, a message 412 that provisions a public key of the sniffer tool 240 to the first wireless device 210. The SPS 252 of the first wireless device 210 uses the public key of the sniffer tool 240 to authenticate the sniffer tool 240. In at least one example, the message 412 can include a certificate with the public key of the sniffer tool 240 and a digital signature. The SPS 252 may be configured to use the digital signature of the certificate to prove validity of the public key of the sniffer tool 240. The SPS 252 may be configured to use a root-of-trust stored in a hardware security module or a trusted platform module of the first wireless device 210 to verify the digital signature of the certificate.

The OOB key exchange 410 can also include the SPC 254 receiving, via an OOB channel, a message 414 that provisions a public key of the first wireless device 210 to the sniffer tool 240. The SPC 254 of the sniffer tool 240 may be configured to use the public key of the first wireless device 210 to authenticate the first wireless device 210. In at least one example, the first wireless device 210 and the sniffer tool 240 establish the trusted relationship without the SPC 254 authenticating the first wireless device 210. In at least one example, the message 414 can include a certificate with the public key of the first wireless device 210 and a digital signature. The SPC 254 may be configured to use the digital signature of the certificate to prove validity of the public key of the first wireless device 210. The SPC 254 may be configured to use a root-of-trust stored in a hardware security module or a trusted platform module of the sniffer tool 240 to verify the digital signature of the certificate. In at least one example, the SPS 252 and the SPC 254 can receive the message 412 and the message 414, respectively, at different times. In at least one example, the SPS 252 and the SPC 254 can receive the message 412 and the message 414, respectively, via different OOB channels.

The signaling diagram 400 can also include the first wireless device 210 receiving a message 420 that includes an enabling command. The first wireless device 210 may be configured to use the enabling command of the message 420 to transition the SPS 252 between a disabled state and an enabled state. The first wireless device 210 may be configured to transitioning the SPS 252 between the disabled state and the enabled state to reduce power consumption by the first wireless device 210 and to control availability of functionalities provided by the SPS 252. In FIG. 4, the first wireless device 210 receives the message 420 from an entity (not shown) that is external to the first wireless device 210. In at least one example, the first wireless device 210 can validate that an entity providing the enabling command is authorized to run the enabling command before transitioning to the enabled state. In at least one example, the first wireless device 210 can receive the message 420 responsive to an interaction with an interface (e.g., a switch, a button, and/or another interface). In at least one example, the message 420 that includes the enabling command is omitted. In at least one example, an application programming interface (API) of the first wireless device 210 receives the message 420.

The signaling diagram 400 also includes the SPC 254 receiving, via an OOB channel, a message 430 that includes a shared password of a network (e.g., the WLAN 202). The shared password of the message 430 may be specific to an access point of the network. The SPC 254 of the sniffer tool 240 may be configured to use the shared password of the message 430 to build a session key that is uniquely related to a communication session established between the first STA 212 of the first wireless device 210 and the second STA 222 of the second wireless device 220. In FIG. 4, the SPC 254 receives the message 430 from an entity (not shown) that is external to the sniffer tool 240. In at least one example, the first wireless device 210 receives the message 420 and the SPC 254 receives the message 430 from the same entity. In at least one example, the first wireless device 210 receives the message 420 that includes the enabling command and the SPC 254 receives the message 430 that includes the shared password from different entities.

The signaling diagram 400 also includes the SPS 252 receiving a message 440 from the first STA 212 that includes key material that is uniquely related to a communication session established between the first STA 212 and the second STA 222. In at least one example, the SPS 252 can receive the message 440 from a hook that may be configured to monitor calls to a cryptographic function of the first STA 212. The calls can include cryptographic parameters that are passed to the cryptographic function of the first STA 212 to generate a session key that is uniquely related to the communication session. The signaling diagram 400 also includes the SPS 252 publishing a message 450 over a channel (e.g., channel 256) to the SPC 254 based on the trusted relationship between the first wireless device 210 and the sniffer tool 240. The message 450 can include the key material that the SPS 252 receives in the message 440 from the first STA 212. In at least one example, the SPS 252 encrypts the key material in the message 450 to reduce exposure of the key material to untrusted entities. In at least one example, the SPS 252 uses an elliptic curve integrated encryption scheme (ECIES) to encrypt the key material in the message 450. The SPS 252 may be configured to use the public key of the sniffer tool 240 the message 412 to encrypt the key material in the message 450. The SPC 254 may be configured to use a private key of the sniffer tool 240 to decrypt the key material in the message 450 where the private key of the sniffer tool 240 forms a key pair with the public key of the sniffer tool 240 that the message 412 provisions to the first wireless device 210.

The signaling diagram 400 also includes a message 460 to a cryptographic function of the SPC 254. The message 460 can include the shared password the SPC 254 receives in the message 430 and the key material that the SPS 252 publishes in the message 450. The cryptographic function of the SPC 254 may be configured to build the session key that is uniquely related to the communication session established between the first STA 212 and the second STA 222. In at least one example, the SPC 254 receiving the message 450 that the SPS 252 publishes over the channel triggers the message 460 to the cryptographic function of the SPC 254. In at least one example, the message 460 can also include the public key of the first wireless device 210 that the message 414 provisions to the sniffer tool 240. The signaling diagram 400 also includes the SPC 254 sending a message 470 to the sniffer application 242 of the sniffer tool 240 that includes the session key that is uniquely related to the communication session established between the first STA 212 and the second STA 222. The sniffer application 242 may be configured to decrypt packets (e.g., packet 235) of the communication session that are captured or intercepted by the sniffer tool 240.

Figure 5:
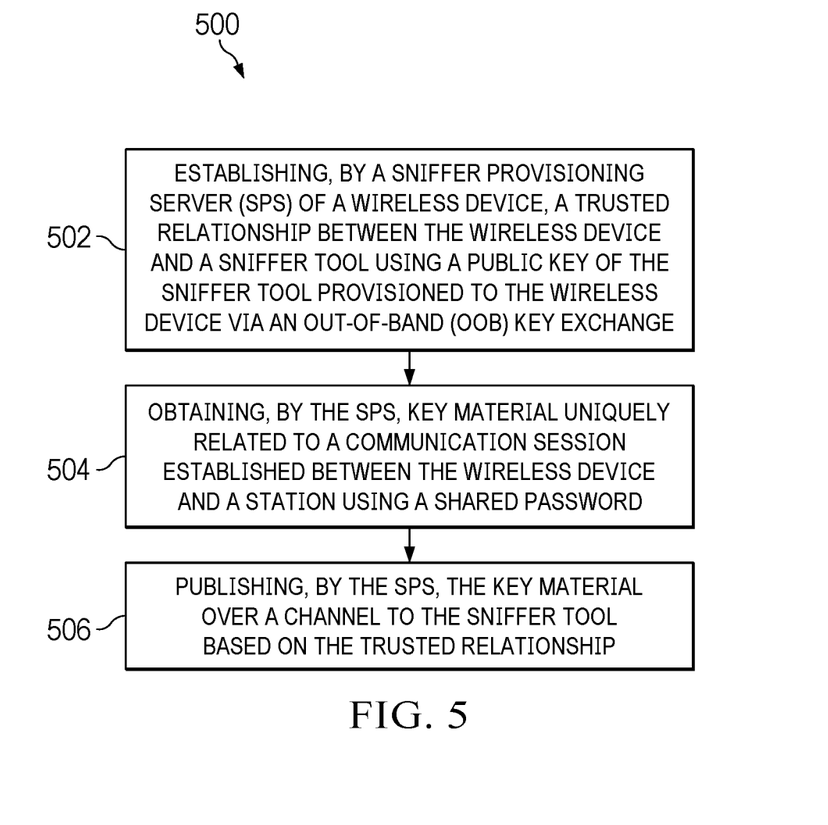
FIG. 5 is a flow diagram of a method for secure sniffing of wireless connections with forward secrecy, in accordance with various examples.

FIG. 5 is a flow diagram of a method 500 for secure sniffing of wireless connections with forward secrecy, in accordance with various examples. The method 500 is performed by a wireless device configured to establish a trusted relationship with a sniffer tool via an OOB key exchange. For example, the first wireless device 210 may be configured to establish a trusted relationship with the sniffer tool 240 via an OOB key exchange between the SPS 252 and the SPC 254. At step 502, an SPS of a wireless device establishes a trusted relationship between the wireless device and a sniffer tool using a public key of the sniffer tool. An OOB key exchange may provision the public key of the sniffer tool to the wireless device via. In at least one example, establishing the trusted relationship can include the SPS authenticating the public key of the sniffer tool using a root-of-trust or a certificate catalog that is signed by the root-of-trust. In at least one example, establishing the trusted relationship can include the SPS authenticating the sniffer tool using the public key of the sniffer tool and a root-of-trust of the wireless device. In at least one example, authenticating the sniffer tool can include the SPS authenticating an entity provisioning the public key of the sniffer tool to the wireless device. In at least one example, the entity provisioning the public key of the sniffer tool to the wireless device is an SPC of the sniffer tool. In at least one example, the entity provisioning the public key of the sniffer tool is an external entity that is external to the sniffer tool. In at least one example, authenticating the sniffer tool can include the SPS verifying a digital signature of a certificate that includes the public key.

At step 504, the SPS obtains key material that is uniquely related to a communication session established between the wireless device and a STA using a shared password. In at least one example, the key material excludes the shared password and a session key uniquely related to the communication session. In at least one example, the wireless device and the STA each generate the session key in accordance with a security protocol (e.g., WPA3-Personal) that encrypts network traffic with forward secrecy. In at least one example, the wireless device and the STA each generate the session key via an SAE exchange between the wireless device and the STA. At step 506, the SPS publishes the key material over a channel to the sniffer tool based on the trusted relationship. The SPS may be configured to secure the channel using the public key of the sniffer tool. In at least one example, the wireless device receives a command to transition the SPS from a disabled state to an enabled state prior to the SPS publishing the encrypted key material. In at least one example, the disabled state is a default state of the SPS. In at least one example, publishing the key material can include the SPS encrypting the key material using the public key of the sniffer tool to generate encrypted key material. In at least one example, publishing the key material can include the SPS publishing the encrypted key material to the SPC of the sniffer tool.

Figure 6:
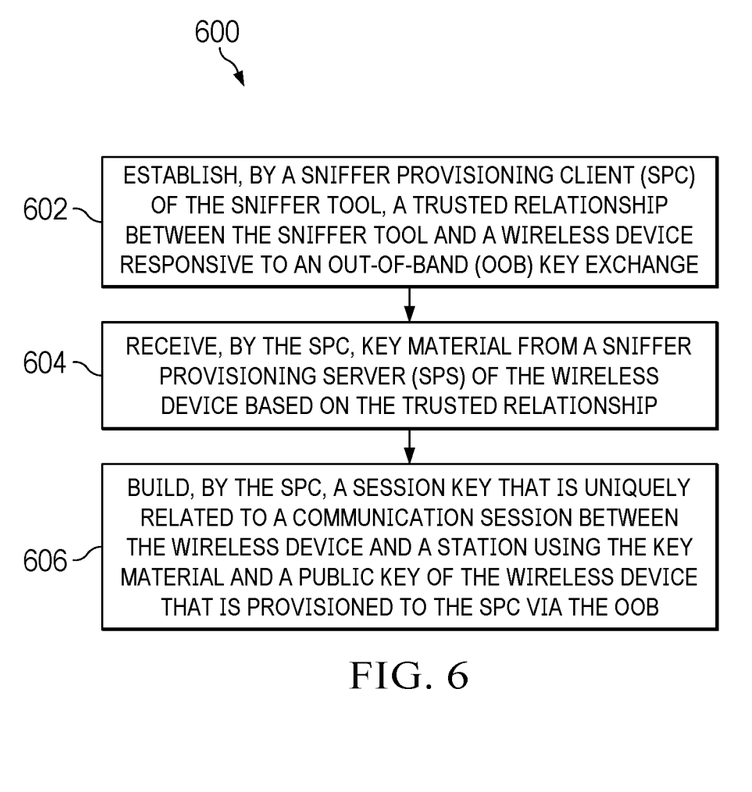
FIG. 6 is a flow diagram of a method for secure sniffing of wireless connections with forward secrecy, in accordance with various examples.

FIG. 6 is a flow diagram of a method 600 for secure sniffing of wireless connections with forward secrecy, in accordance with various examples. The method 600 is performed by a sniffer tool configured to establish a trusted relationship with a wireless device via an OOB key exchange. For example, the sniffer tool 240 can establish a trusted relationship with the first wireless device 210 via an OOB key exchange between the SPC 254 and the SPS 252. At step 602, an SPC of a sniffer tool establishes a trusted relationship between the sniffer tool and a wireless device responsive to an OOB key exchange. The OOB key exchange provisions a public key of the wireless device to the SPC of the sniffer tool.

At step 604, the SPC receives key material from a SPS of the wireless device based on the trusted relationship. The key material is uniquely related to a communication session established between the wireless device and a STA using a shared password. The key material can exclude the shared password and a session key that is uniquely related to the communication session. In at least one example, the SPC receives the key material via an OOB channel. In this example, a shared secret generated using a private key of the wireless device and a public key of the sniffer tool secures the OOB channel. The private key of the wireless device can form a key pair with the public key of the wireless device. In at least one example, the SPC receives the key material via an IB channel that SPS secures using a public key of the sniffer tool. In at least one example, the SPC receives the shared password from an entity that is external to the wireless device. In at least one example, the SPS of the wireless device uses a public key of the sniffer tool to encrypt the key material. In at least one example, the SPC decrypts the key material using a private key of the sniffer tool that forms a key pair with the public key of the sniffer tool.

At step 606, the SPC builds the session key using the public key of the wireless device and the key material. In at least one example, the sniffer tool intercepts a packet sent in the communication session. The packet can include a payload. The session key encrypts the payload with forward secrecy. In at least one example, the session key is generated in accordance with a security protocol (e.g., WPA3-Personal) that encrypts network traffic with forward secrecy. In at least one example, an SAE exchange between the wireless device and the STA generates the session key. In at least one example, the sniffer tool captures handshake messages corresponding to the SAE exchange between the wireless device and the STA prior to step 604. In this example, the SPC builds the session key using information from the captured handshake messages together with the key material and the shared password that the SPC receives from an entity that is external to the wireless device. In at least one example, the sniffer tool decrypts the payload of the packet using the session key. In at least one example, the SPC generates a shared secret using the public key of the wireless device and a private key of the sniffer tool. The OOB key exchange provisions a public key of the sniffer tool to the wireless device. The public key of the sniffer tool forms a key pair with the private key of the sniffer tool.

Figure 7:
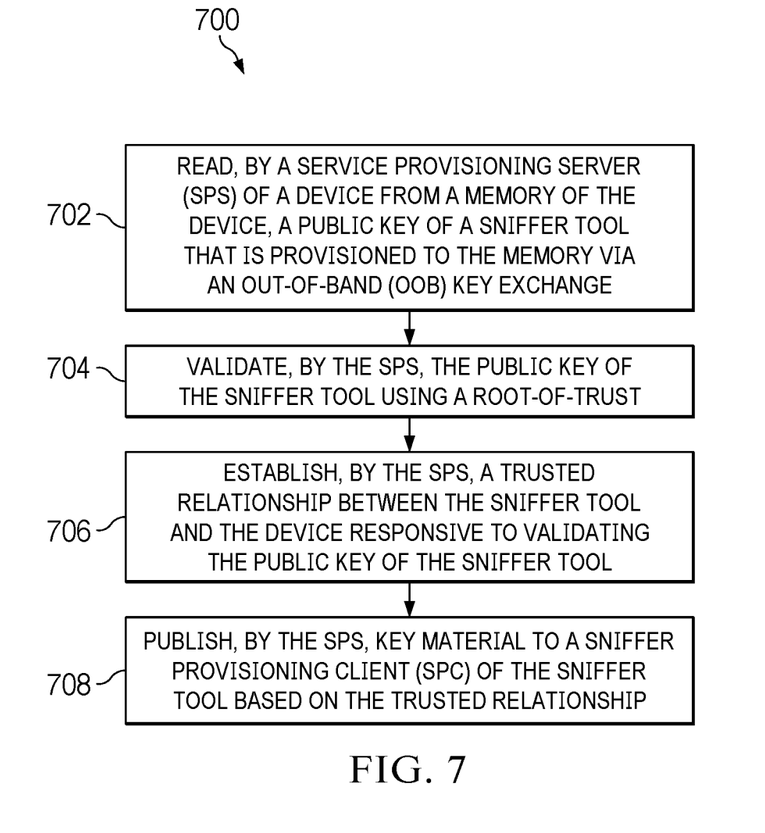
FIG. 7 is a flow diagram of a method for secure sniffing of wireless connections with forward secrecy, in accordance with various examples.

FIG. 7 is a flow diagram of a method 700 for secure sniffing of wireless connections with forward secrecy, in accordance with various examples. The method 700 is performed by a device configured to establish a trusted relationship with a sniffer tool via an OOB key exchange. For example, the first wireless device 210 may be configured to establish a trusted relationship with the sniffer tool 240 via an OOB key exchange between the SPS 252 and the SPC 254. At step 702, an SPS of a device reads, from a memory of the device, a public key of a sniffer tool. An OOB key exchange provisions the public key of the sniffer tool to the memory of the device. At step 704, the SPS authenticates the public key of the sniffer tool using a root-of-trust. In at least one example, a hardware security module or a trusted platform module of the device stores the root of trust. At step 706, the SPS establishes a trusted relationship between the sniffer tool and the device responsive to validating the public key of the sniffer tool. In at least one example, the SPS may be configured to update a trusted peer list of the device to include the sniffer tool based on the trusted relationship.

At step 708, the SPS publishes key material to a sniffer provisioning client (SPC) of the sniffer tool based on the trusted relationship. The key material is uniquely related to a communication session established between the device and a STA using a shared password. The key material can exclude the shared password and a session key uniquely related to the communication session. In at least one example, the device and the STA may each be configured to generate the session key in accordance with a security protocol (e.g., WPA3-Personal) for encrypting network traffic with forward secrecy. In at least one example, an SAE exchange between the wireless device and the STA generates the session key. In at least one example, the device and the STA may each be configured to generate the session key using a pairwise master key that is uniquely related to the communication session. In at least one example, the SPS may be configured to use the public key of the sniffer tool and a private key of the device to generate a shared secret. In this example, the SPS may be configured to encrypt the key material using the shared secret. The private key of the device can form a key pair with a public key of the device. The OOB key exchange provisions the public key of the device to the sniffer tool. In at least one example, the shared password is specific to an access point of a wireless network and the STA is the access point.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

What is claimed is:

1. A method comprising:
    establishing a secure communication channel between a server of a first wireless device and a sniffer device using a public key of the sniffer device;
    obtaining, by the server, key material uniquely related to a communication session established between the first wireless device and a second wireless device, wherein the communication session is established using a shared password, wherein the key material excludes the shared password and a session key uniquely related to the communication session; and
    transmitting, by the server, the key material over the secure communication channel to the sniffer device, wherein the secure communication channel is secured using the public key of the sniffer device.

2. The method of claim 1, further comprising authenticating, by the server, the public key of the sniffer device using a root-of-trust or a certificate catalog that is signed by the root-of-trust.

3. The method of claim 1, further comprising:
    receiving, by the first wireless device, a command to transition the server from a disabled state to an enabled state prior to the server transmitting the key material.

4. The method of claim 2,
    further comprising verifying, by the server, a digital signature of a certificate that includes the public key of the sniffer device.

5. The method of claim 1, wherein transmitting the key material comprises:
    encrypting, by the server, the key material using the public key of the sniffer device to generate encrypted key material; and
    transmitting, by the server, the encrypted key material to a sniffer provisioning client of the sniffer device.

6. The method of claim 3, wherein the server automatically returns from the enable state to the disable state by default.

7. The method of claim 1, further comprising receiving, by the server, the shared password from an entity that is external to the first wireless device.

8. The method of claim 1, further comprising updating, by the server, a trusted peer list of the first wireless device to include the sniffer device based on the establishing of the secure communication channel.

9. The method of claim 1, wherein the shared password is specific to and access point of a wireless network, and the second wireless device is the access point.

10. The method of claim 5, further comprising decrypting, by the sniffer provisioning client, the key material using a private key of the sniffer device.

11. The method of claim 1, wherein an out-of-band (OOB) key exchange provisions the public key of the sniffer device to the first wireless device.

12. The method of claim 1, further comprising:
receiving, by the server, a first message from the sniffer device, wherein the first message comprises the public key of the sniffer device; and
encrypting, by the server, the key material using the public key of the sniffer device to generate encrypted key material, wherein transmitting the key material over the secure communication channel to the sniffer device comprises transmitting, by the server, the encrypted key material.

13. The method of claim 12, wherein the communications session is established between the first and second wireless devices in a wireless local area network (WLAN), and wherein the first message is received by the server via an out-of-band (OOB) channel that excludes the WLAN.

14. The method of claim 1, further comprising receiving, by the server, the key material via an in-band channel that is secured using the public key of the sniffer device.

15. The method of claim 1, wherein the first wireless device or the second wireless device is an access point (AP) of a wireless local area network (WLAN).

16. The method of claim 1, further comprising:
intercepting, by the sniffer device, a packet transmitted between the first and second wireless devices; and
decrypting, by the sniffer device, a payload of the packet using the session key.

17. The method of claim 16, wherein the payload is encrypted according to a simultaneous Authentication of Equals (SAE) protocol.

18. The method of claim 16, wherein a header of the packet is unencrypted.

19. The method of claim 1, further comprising generating, by the sniffer device, the session key using the shared password and the key material.

20. The method of claim 1, wherein the key material comprises first and second random numbers associated with the first wireless device, and third and fourth random numbers associated with the second wireless device.

* * * * *